United States Patent
Aase

(10) Patent No.: US 10,192,383 B2
(45) Date of Patent: Jan. 29, 2019

(54) FIRST ENTRY NOTIFICATION

(71) Applicant: ASSA ABLOY AB, Stockholm (SE)

(72) Inventor: Halvor Aase, Moss (NO)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/509,536

(22) PCT Filed: Sep. 9, 2015

(86) PCT No.: PCT/IB2015/001926
§ 371 (c)(1),
(2) Date: Mar. 8, 2017

(87) PCT Pub. No.: WO2016/038457
PCT Pub. Date: Mar. 17, 2016

(65) Prior Publication Data
US 2017/0287248 A1    Oct. 5, 2017

Related U.S. Application Data

(60) Provisional application No. 62/048,702, filed on Sep. 10, 2014.

(51) Int. Cl.
*G07C 9/00* (2006.01)
*G06Q 10/02* (2012.01)

(52) U.S. Cl.
CPC ..... *G07C 9/00857* (2013.01); *G07C 9/00309* (2013.01); *G07C 9/00571* (2013.01); *G07C 9/00904* (2013.01); *G06Q 10/02* (2013.01); *G07C 2009/00865* (2013.01)

(58) Field of Classification Search
CPC ................ G16H 10/60; G06F 21/35
USPC .......................................... 235/382
See application file for complete search history.

(56) References Cited

U.S. PATENT DOCUMENTS

| | | |
|---|---|---|
| 4,727,368 A | 2/1988 | Larson et al. |
| 5,204,663 A | 4/1993 | Lee |
| 5,678,200 A | 10/1997 | Levi |
| 5,903,845 A | 5/1999 | Buhrmann et al. |
| 6,095,416 A | 8/2000 | Grant et al. |
| 6,216,227 B1 | 4/2001 | Goldstein |
| 6,257,486 B1 | 7/2001 | Teicher et al. |

(Continued)

FOREIGN PATENT DOCUMENTS

| | | |
|---|---|---|
| EP | 0829828 | 3/1998 |
| EP | 1103922 | 5/2001 |

(Continued)

OTHER PUBLICATIONS

"Nokia Launches NFC Shell for Mobile Payments," ESATO, 2005, 3 pages.

(Continued)

*Primary Examiner* — Allyson Trail
(74) *Attorney, Agent, or Firm* — Sheridan Ross P.C.

(57) ABSTRACT

An access control system is disclosed in which a user or guest's first entry or usage of an electronic key is reported. Reporting of the first entry or usage may include information particular to the initial transaction and may be delivered by a path that is substantially the same, but reversed, from an original key delivery path. In this way, non-networked or 'offline' locks/readers can report first entry or usage of an electronic key.

18 Claims, 9 Drawing Sheets

(56) References Cited

U.S. PATENT DOCUMENTS

| | | |
|---|---|---|
| 6,374,356 B1 | 4/2002 | Daigneault et al. |
| 6,577,299 B1 | 6/2003 | Schiller et al. |
| 6,624,739 B1 | 9/2003 | Stobbe |
| 6,668,322 B1 | 12/2003 | Wood et al. |
| 6,719,200 B1 | 4/2004 | Wiebe |
| 6,766,450 B2 | 7/2004 | Micali |
| 6,859,650 B1 | 2/2005 | Ritter |
| 6,895,234 B1 | 5/2005 | Laursen et al. |
| 7,012,503 B2 | 3/2006 | Nielsen |
| 7,114,179 B1 | 9/2006 | Ritter et al. |
| 7,190,948 B2 | 3/2007 | Donley et al. |
| 7,197,767 B2 | 3/2007 | Kusakabe et al. |
| 7,205,882 B2 | 4/2007 | Libin |
| 7,308,254 B1 | 12/2007 | Rissanen |
| 7,363,252 B2 | 4/2008 | Fujimoto |
| 7,376,839 B2 | 5/2008 | Carta et al. |
| 7,380,279 B2 | 5/2008 | Prokupets et al. |
| 7,600,129 B2 | 10/2009 | Libin et al. |
| 7,616,091 B2 | 11/2009 | Libin |
| 7,698,566 B1 | 4/2010 | Stone |
| 7,706,778 B2 | 4/2010 | Lowe |
| 7,716,486 B2 | 5/2010 | Libin et al. |
| 7,730,126 B2 | 6/2010 | Crawford |
| 7,775,429 B2 | 8/2010 | Radicella et al. |
| 7,822,989 B2 | 10/2010 | Libin et al. |
| 7,823,193 B2 | 10/2010 | Ritter et al. |
| 7,873,989 B2 | 1/2011 | Karkas et al. |
| 8,074,271 B2 | 12/2011 | Davis et al. |
| 8,102,799 B2 | 1/2012 | Alexander et al. |
| 8,150,374 B2 | 4/2012 | Lowe |
| 8,572,705 B2 | 10/2013 | Ritter et al. |
| 8,578,472 B2 | 11/2013 | Davis et al. |
| 8,730,004 B2 | 5/2014 | Elfstrom et al. |
| 2001/0018660 A1 | 8/2001 | Sehr |
| 2003/0151493 A1 | 8/2003 | Straumann et al. |
| 2003/0189096 A1 | 10/2003 | Markkanen et al. |
| 2003/0190887 A1 | 10/2003 | Hook et al. |
| 2003/0216143 A1 | 11/2003 | Rose et al. |
| 2004/0039916 A1 | 2/2004 | Aldis et al. |
| 2004/0050930 A1 | 3/2004 | Rowe |
| 2004/0059590 A1 | 3/2004 | Mercredi et al. |
| 2004/0078594 A1 | 4/2004 | Scott |
| 2004/0130437 A1 | 7/2004 | Stevens |
| 2004/0167881 A1 | 8/2004 | Masuka |
| 2004/0177270 A1 | 9/2004 | Little et al. |
| 2005/0055562 A1 | 3/2005 | Guthery |
| 2005/0149443 A1 | 7/2005 | Torvinen |
| 2005/0178833 A1 | 8/2005 | Kisliakov |
| 2005/0271250 A1 | 12/2005 | Vallone et al. |
| 2006/0049255 A1 | 3/2006 | von Mueller et al. |
| 2006/0052091 A1 | 3/2006 | Onyon et al. |
| 2006/0164235 A1 | 7/2006 | Gounder |
| 2006/0165060 A1 | 7/2006 | Dua |
| 2006/0170533 A1 | 8/2006 | Chioiu et al. |
| 2006/0182661 A1 | 8/2006 | Aquila |
| 2007/0067400 A1 | 3/2007 | Kawakami et al. |
| 2008/0107269 A1 | 5/2008 | Gehrmann et al. |
| 2008/0211620 A1 | 9/2008 | Willgert |
| 2009/0183541 A1 | 7/2009 | Sadighi et al. |
| 2010/0042954 A1 | 2/2010 | Rosenblatt et al. |
| 2010/0106773 A1 | 4/2010 | Tsutazawa et al. |
| 2010/0245033 A1 | 9/2010 | Sasakuma |
| 2011/0093928 A1 | 4/2011 | Nakagawa et al. |
| 2011/0187493 A1 | 8/2011 | Elfstrom et al. |
| 2012/0114122 A1 | 5/2012 | Metivier |
| 2012/0157058 A1 | 6/2012 | Lowe |
| 2012/0278901 A1 | 11/2012 | Bunter |
| 2013/0093563 A1 | 4/2013 | Adolfsson et al. |
| 2014/0013418 A1 | 1/2014 | Davis et al. |
| 2014/0025408 A1 | 1/2014 | Ritter et al. |
| 2014/0123317 A1 | 5/2014 | Sughihara |
| 2015/0109098 A1 | 4/2015 | Singh |
| 2015/0213247 A1 | 7/2015 | Davis et al. |
| 2015/0213248 A1 | 7/2015 | Davis et al. |
| 2015/0215322 A1 | 7/2015 | Davis et al. |
| 2015/0220711 A1 | 8/2015 | Lowe |
| 2015/0220721 A1 | 8/2015 | Davis et al. |
| 2015/0220722 A1 | 8/2015 | Davis et al. |
| 2015/0222613 A1 | 8/2015 | Lowe |
| 2015/0222622 A1 | 8/2015 | Lowe |
| 2015/0222623 A1 | 8/2015 | Lowe |
| 2015/0223066 A1 | 8/2015 | Lowe |
| 2015/0223067 A1 | 8/2015 | Lowe |
| 2016/0005248 A1 | 1/2016 | Aase |
| 2018/0005468 A1* | 1/2018 | Hamilton, II ......... H04W 4/023 |
| 2018/0084424 A1* | 3/2018 | Sonasath ............... G06Q 10/02 |
| 2018/0114036 A1* | 4/2018 | Spodak ................. H04W 76/14 |
| 2018/0130548 A1* | 5/2018 | Fisher ................... G16H 10/60 |

FOREIGN PATENT DOCUMENTS

| | | |
|---|---|---|
| EP | 1333409 | 8/2003 |
| EP | 1562153 | 8/2005 |
| EP | 1628255 | 2/2006 |
| EP | 1841166 | 10/2007 |
| EP | 2355050 | 8/2011 |
| EP | 2701124 | 2/2014 |
| EP | 2736021 | 5/2014 |
| FR | 2839833 | 11/2003 |
| GB | 2010375 | 6/1979 |
| JP | 2002-129792 | 5/2002 |
| KR | 10-2004-032311 | 4/2004 |
| WO | WO 97/45614 | 12/1997 |
| WO | WO 02/096070 | 11/2002 |
| WO | WO 03/081934 | 10/2003 |
| WO | WO 04/025545 | 3/2004 |
| WO | WO 05/024549 | 3/2005 |
| WO | WO 2005/038728 | 4/2005 |
| WO | WO 2005/091516 | 9/2005 |
| WO | WO 2005/096651 | 10/2005 |
| WO | WO 2007/126375 | 11/2007 |
| WO | WO 2007/139909 | 12/2007 |
| WO | WO 2008/024162 | 2/2008 |
| WO | WO 2008/024320 | 2/2008 |
| WO | WO 2008/035115 | 3/2008 |
| WO | WO 2008/042302 | 4/2008 |
| WO | WO 2014/007870 | 1/2014 |

OTHER PUBLICATIONS

"About Near Field Communication," NFC Forum, 2005, retrieved from http://www.nfc-forum.org/aboutnfc/, 3 pages.

"Near Field Communication PN511-Transmision module," Phillips Semiconductors, 2004, 18 pages.

"Product Families," Indala, 2004, retrieved from www.indala.com/products/index.html, 2 pages.

"Use Cases," NOKIA, 2005, http://www.nokia.com, 2 pages.

International Search Report and Written Opinion for International (PCT) Patent Application No. PCT/IB2015/001926, dated Feb. 4, 2016, 17 pages.

International Preliminary Report on Patentability for International (PCT) Patent Application No. PCT/IB2015/001926, dated Mar. 10, 2017, 21 pages.

Official Action for European Patent Application No. 15788185.5, dated Apr. 24, 2017, 2 pages.

International Search Report and Written Opinion for International (PCT) Patent Application No. PCT/US06/15304, dated Jun. 11, 2008, 8 pages.

Official Action for Australian Patent Application No. 2006343377, dated Jun. 3, 2010, 2 pages.

Official Action for Canadian Patent Application No. 2,647,713 dated Nov. 20, 2012, 2 pages.

Notice of Allowance for Canadian Patent Application No. 2,647,713 dated Jul. 8, 2013, 1 page.

Official Action for U.S. Appl. No. 11/397,542, dated Oct. 28, 2008, 15 pages.

Official Action for U.S. Appl. No. 11/397,542, dated Mar. 31, 2009, 16 pages.

Official Action for U.S. Appl. No. 11/397,542, dated Sep. 14, 2009, 12 pages.

(56) References Cited

OTHER PUBLICATIONS

Notice of Allowance for U.S. Appl. No. 11/397,542, dated Feb. 18, 2010, 16 pages.
Official Action for U.S. Appl. No. 12/628,574, dated May 26, 2011, 23 pages.
Notice of Allowance for U.S. Appl. No. 12/628,574, dated Nov. 15, 2011, 12 pages.
Official Action for U.S. Appl. No. 13/404,915, dated Jun. 4, 2012, 11 pages.
Official Action for U.S. Appl. No. 13/404,915, dated Dec. 3, 2012, 16 pages.
Official Action for U.S. Appl. No. 13/404,915, dated Jun. 14, 2013, 9 pages.
Examiner's Answer for U.S. Appl. No. 13/404,915, dated Feb. 7, 2014, 19 pages.
Official Action for U.S. Appl. No. 14/674,125, dated May 22, 2015, 9 pages.
Official Action for U.S. Appl. No. 14/674,167, dated Jun. 5, 2015, 11 pages.
Petition for Inter Partes Review of U.S. Pat. No. 7,706,778, filed Jun. 18, 2015, 64 pages.
Joint Claim Construction Statement for Case No. SACV-14-00947-CJC (DFMx), Exhibit A of Petition for Inter Partes Review of U.S. Pat. No. 7,706,778, filed Jun. 18, 2015, 21 pages.
Declaration of Bruce Schneier in Support of Request for Inter Partes Review of the '778 Patent, dated Jun. 17, 2015, 77 pages.
Petition for Inter Partes Review of U.S. Pat. No. 8,150,374, filed Jun. 18, 2015, 64 pages.
Declaration of Bruce Schneier in Support of Request for Inter Partes Review of the '374 Patent, dated Jun. 17, 2015, 134 pages.
Official Action for Australian Patent Application No. 2015313921, dated Jan. 18, 2018, 5 pages.
Official Action for Australia Patent Application No. 2015313921, dated Oct. 3, 2018 3 pages.

* cited by examiner

FIRST ENTRY NOTIFICATION

CROSS REFERENCE TO RELATED APPLICATIONS

This application is a national stage application under 35 U.S.C. 371 of PCT Application No. PCT/IB2015/001926, having an international filing date of Sep. 9, 2015, which designated the United States, which PCT application claimed the benefit of U.S. Application Ser. No. 62/048,702, filed Sep. 10, 2014, both of which are incorporated by reference in their entirety.

FIELD OF THE DISCLOSURE

The present disclosure is generally directed to access control systems and methods of operating the same.

BACKGROUND

A smart card, chip card, or integrated circuit card (ICC) is any pocket-sized card with embedded integrated circuits. Smart cards are traditionally made of plastic. One common use for smart cards is in the security of hotels and the like.

Hotels and other multi-room facilities often employ property management systems that are separate from the access control systems used to physical secure the rooms in the facility. For example, hotels traditionally use their property management systems to manage and allocate guests rooms and to track transactions such as guest purchases at restaurants, valet, mini-bar, and other in-room purchases. A new guest account is usually created in the property management system per room during guest check-in with the hotel front desk.

SUMMARY

In environments where a guest is able to bypass the front desk check-in process, the hotel faces new challenges. One of these challenges is associated with completing the guest check-in procedures in the property management system even though the guest never arrives at the front desk to check-in. It is desirable to enable guests to bypass the front desk to make the guest experience better and less administratively-burdensome. However, without having the guest arrive at the front desk, there needs to be a way to communicate the guest's check-in back to the property management system from the access control system, even though the two systems are separate and discrete systems.

It is, therefore, one aspect of the present disclosure to allow an access control system to detect, record, and automatically distribute information regarding the first time a given electronic key arrives at or gains access through a given 'offline lock'. Previously, automatic distribution of such information has been possible for 'online locks' but not for 'offline locks'.

An 'online lock' is a lock with inbuilt networking capability, which allows it to automatically report events back to the access control system. Typical events might be key usage, door opened, etc. Typical networks used might be wired or wireless Ethernet, Radio Frequency networks etc.

In contrast, an 'offline lock' is a lock with no such network capability, hence no previous means of automatic lock event reporting back to the access control system.

In some embodiments, an access control system is proposed that includes the following components:

a1) access code/credential generation: generates electronic keys that can be stored on a phone (or other mobile device) and then used at locks;

a2) secure distribution of the electronic keys to the targeted phones/devices;

a3) software on the phones/devices to store the electronic keys and send them to the locks, typically using Radio Frequency (RF) communication;

a4) offline lock electronics and firmware to receive the electronic keys from the phone/device decipher them and decide whether to grant access.

In some embodiments, electronic keys can be distributed to mobile devices via an electronic key delivery path. As a non-limiting example, an electronic key is generated in response to a request from an external system (e.g., a property management system). The key is securely distributed to the software application on the phone/mobile device of the intended recipient. This distribution uses standard networks and protocols available to the device, such as Wi-Fi or cellular data, depending upon encryption requirements, customer preferences, and the like. When the phone/mobile device is presented to a lock within the access control system, the key is transmitted via RF, Bluetooth, infrared, or some other contactless delivery mechanism to the lock electronics where access control logic on the lock (e.g., firmware) examines the key and determines whether to grant access or not.

In some embodiments, the lock is offline, which means that the lock cannot, by itself, report resulting information to other parts of the access control system via a shared network. In the proposed system, a reverse path to the key delivery path is used to propagate information back from the lock and through the access control system. Rather than use dedicated networks that would be available to an 'online lock', the networks available on the phone/mobile device are used. This enables more 'offline locks' to be used in an access control system, which greatly reduces the overall costs associated with implementing such a system (e.g., because dedicated wiring or networking components are not required to support the reporting mechanisms).

With respect to a return path, when the phone/mobile device is presented to the lock, information from the lock is transmitted via RF, Bluetooth, infrared, or some other contactless delivery mechanism from the lock electronics and firmware to the software application on the phone/mobile device. The information contained in this communication may include, without limitation, the current time (e.g., corresponding to a transaction time), the identity of the lock, the result (access granted or not) of the access control decision, and whether this is the first time the key has been used at that lock or whether it is the first time the key has ever been used with any lock. The software application then uses available networks and/or protocols of the phone/mobile device to transmit this information back to the originating part of the access control system. Upon receiving the information from the phone/mobile device, the originating part of the access control system can register that the key has arrived at its destination and has been used. Additionally, the arrival/first entry information can be transmitted back to other external systems (e.g., a property management system) from various points in the access control system.

Although examples of the present disclosure will be primarily discussed in connection with access control systems of a hotel or similar type of multi-room facility, it should be appreciated that embodiments of the present disclosure are not so limited. As some non-limiting examples, embodiments of the present disclosure could be used in the following types of access control systems: hotel (has a guest arrived at their room); residential (has a workman arrived at a house); office (has a staff member arrived to start work), etc.

In a specific example of a hotel implementing embodiments of the present disclosure, the following steps may occur: (1) The hotel operator organizes for the property management system at a hotel to request generation of a room access key for a guest; (2) an electronic key is generated and is sent to the access control system application on that guest's phone/mobile device; (3) the guest arrives at the hotel and presents the phone to unlock the appropriate lock; (4) information (e.g., Room identifier/Success/First Use/etc.) is sent back to the phone application; (5) the phone application sends the above information back to the originating part of the access control system; and then (6) the information is also distributed back to the hotel operator. Once received by the hotel operator, the information may be stored in the property management system database potentially along with other information (e.g., which network carried the electronic key and access information during (5) to/from the mobile device). It should be appreciated that, in some embodiments, some of the above-listed steps may be performed concurrently/simultaneously rather than sequentially. As a non-limiting example, steps (4), (5), and/or (6) may occur during the same transaction as used for (3) in which the guest presents their phone to the appropriate lock, thereby obviating the need for the guest to present their phone to the lock multiple times.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

Figure 1:
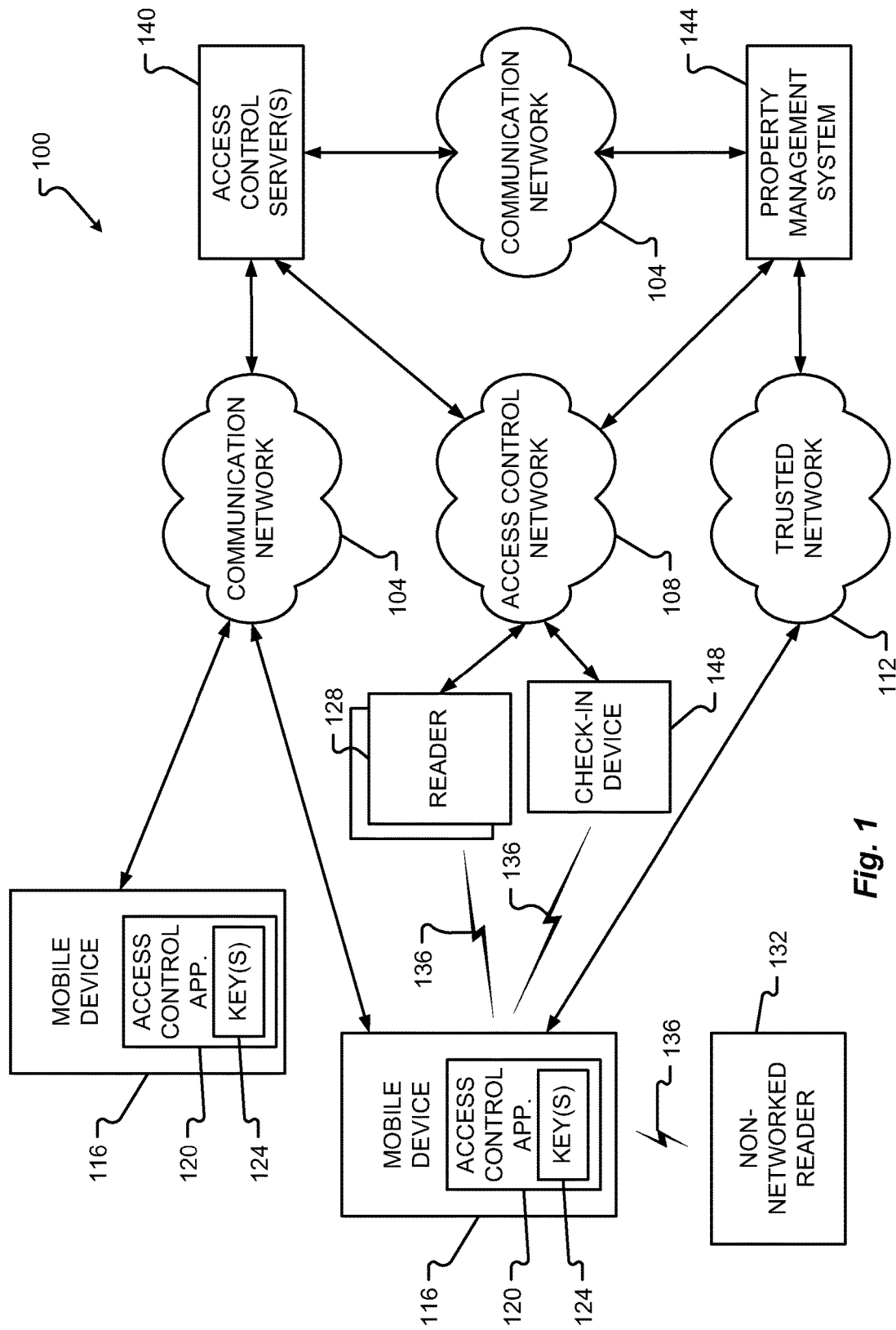
FIG. 1 is a block diagram depicting a communication system in accordance with embodiments of the present disclosure.

The ensuing description provides embodiments only, and is not intended to limit the scope, applicability or configuration of the claims. Rather, the ensuing description will provide those skilled in the art with an enabling description for implementing the described embodiments. It being understood that various changes may be made in the function and arrangement of elements without departing from the spirit and scope of the appended claims.

The following description will provide various embodiments or characteristics of a system, which may include an access control system that facilitates interactions between multiple components. While embodiments of the present disclosure are discussed in connection with an access control system interacting with a property management system of a hotel or the like, it should be appreciated that embodiments of the present disclosure are not so limited.

With reference now to FIGS. 1-9, various details and features related to an access control system and methods of operating the same will be described in accordance with at least some embodiments of the present disclosure. With initial reference to FIG. 1, a communication system 100 will be described in accordance with at least some embodiments of the present disclosure. The system 100 is shown to include one or multiple communication networks 104, an access control network 108, and an optional trusted network 112. Although depicted as two separate and distinct networks, it should be appreciated that the communication networks 104 may be implemented as a single network. Likewise, although network 104 and trusted network 112 are depicted as separate networks, it should be appreciated that the networks may be combined or one network (e.g., the trusted network 112) may be overlaid on top of the communication network 104, via communication tunneling (e.g., a Virtual Private Network (VPN), Wide Area Network (WAN), or the like). Thus, the communication network 104 may include a trusted network 112 overlaid thereon without departing from the scope of the present disclosure.

The access control network 108 may provide connectivity between one or more access control servers 140 and a plurality of readers 128, check-in devices 148, and other components of an access control system. Thus, the access control network 108 may enable the administration and implementation of a Physical Access Control System (PACS) or the like. The access control network 108 may use any type of known communication protocol to carry information between components connected thereto. Non-limiting examples of the protocols or networks that may be used within access control network 108 include RS-232, RS-485, Wiegand, Ethernet, Power over Ethernet (PoE), ZigBee, Wi-Fi (e.g., IEEE 802.11, variants thereof, or extensions thereto), an Internet Protocol (IP) network, or any other type of wired or wireless protocol.

The communication network 104 may correspond to a private, semi-private, or public communication network used to carry information between compatible communication devices. In some embodiments, the communication network 104 may correspond to an untrusted or unsecured communication network. Non-limiting examples of a communication network 104 include a telephone network, a cellular network, an IMS network, a Wide Area Network (e.g., the Internet), a Local Area Network, an IP network, an SNMP network, or any other known type of network architecture. One or more of email messages, SMS messages, MMS messages, SNMP messages, messages transmitted using HTTP or SHTTP or variants thereof, messages exchanged using FTP, messages exchanged using RTP or UDP, or the like can be used to carry information between an access control server 140 and a mobile device 116. In some embodiments, Voice over IP (VoIP) or the like can also be used to carry information between the access control server 140 and mobile device 116.

The reader 128 may correspond to any type of interaction device or set of interaction devices that limit or control access to one or more protected assets. The reader 128, in some embodiments, may be configured to exchange communications directly with a mobile device 116 via a communications channel 136. The communications channel 136 may be a contactless communications channel in some embodiments. The communications channel 136 may alternatively or additionally be a contact-based communications channel. In some embodiments, electromagnetic radiation in the form of Radio Frequency (RF) waves may be used to carry information on the communications channel 136. Alternatively or additionally, the communications channel 136 may utilize light, magnetic, acoustic, or any other medium to carry information between the reader 128 and mobile device 116. The communication channel 136 may also be characterized by the communication protocol used to exchange information. In some embodiments, signal modulation (e.g., Amplitude Modulation, Frequency Modulation, Phase Modulation, combinations thereof, variants thereof, or the like) is used to communicate data between the reader 128 and mobile device 116. Some non-limiting examples of the protocol(s) that are used on the communication channel 136 include protocols defined in ISO 14443, ISO 15693, ISO 18092, FeliCa, Near Field Communications (NFC), Bluetooth, Wi-Fi (e.g., 802.11N, variants thereof, or extensions thereto), ZigBee, GSM, combinations thereof, etc. It should further be appreciated that depending upon the capabilities of the mobile device 116 and reader 128, it may be possible to establish multiple communication channels 136 between the devices. For instance, the reader 128 and mobile device 116 may establish a first communication channel using a first protocol (e.g., Bluetooth or Bluetooth Low Energy (BLE)) as well as a second communication channel using a second protocol (e.g., NFC, infrared, or the like). It should be appreciated that the communication channel 136 may correspond to a proximity-based communication channel that can only be created when the mobile device 116 and reader 128 are within a predetermined distance of one another (e.g., less than 0.5 meters for NFC, less than 50 meters for BLE, or less than 200 meters for Wi-Fi). The communication channel 136 may be further characterized by the authentication protocol used by the devices (e.g., reader 128 and mobile device 116) to authenticate with one another. Examples of authentication protocols that may be used on the communication channel 136 include SEOS and FIDO.

Although the term "reader" is used herein to refer to a device or collection of devices used to control access to a protected asset (e.g., a physical asset such as a door to a room, a safe, etc.), it should be appreciated that the term "reader", "lock", and the like may be used interchangeably. For instance, a networked reader 128 as shown in FIG. 1 may also be referred to as an 'online lock'. Similarly, as will be discussed in further detail herein, a non-network reader 132 may be referred to synonymously as an 'offline lock'. In other words, the use of the term "lock", "reader", and other similar terms may be used to describe an electromechanical device or collection of devices that are used to protect and secure an asset, such as a physical asset. Furthermore, the reader or lock as discussed herein may be used to protect and secure logical assets, such as bank accounts, computer network resources, and the like.

In addition to the traditional reader 128 that is depicted as being connected to an access control network 108, the communication system 100 also includes one or more non-networked readers 132 or 'offline locks'. The non-networked readers 132 may differ from the readers 128 in that the non-networked readers 132 may not be natively or persistently connected to the access control network 108, which subsequently limits the non-networked reader's 132 ability to communicate with access control servers 140 or other devices on an ad-hoc basis. Accordingly, embodiments of the present disclosure suggest utilizing the communication channel 136 to facilitate communication of information from the non-networked reader 132 to the mobile device 116 and eventually back to the access control servers 140 and other devices. Thus, the components of the non-networked reader 132 may be similar or identical to those of the reader 128 except that a communication interface with the access control network 108 may be lacking from the non-networked reader 132 or such an interface may disabled/not be utilized.

The mobile device 116 may correspond to any type of electronic device and, as the name suggests, the electronic device may be portable in nature. As some examples, the mobile device 116 may correspond to a cellular phone or smartphone carried by a user. Other examples of a mobile device 116 include, without limitation, wearable devices (e.g., glasses, watches, shoes, clothes, jewelry, wristbands, stickers, etc.). The mobile device 116, as shown in FIG. 1, may be provided with an access control application 120 that stores one or a plurality of keys 124. The key(s) 132 may be communicated to a reader 128, 132 in connection with a holder of the mobile device 116 attempting to gain access to an asset protected by the reader 128, 132. As an example, the mobile device 116 may be presented to the reader 128, 132 by a user or holder of the mobile device 116.

In some embodiments, the key(s) 124 may be delivered to the mobile device 116 from the access control server 140 via the communication network 104. In other embodiments, the key(s) 124 may be delivered to the mobile device 116 via a check-in device 148, which receives the keys from the access control server(s) 140 over the access control network 108. Additional details of the first key delivery mechanism are described in U.S. Pat. No. 8,074,271 to Davis et al. and U.S. Pat. No. 7,706,778 to Lowe, both of which are hereby incorporated herein by reference in their entirety. Additional details of the second key delivery mechanism (e.g., use of the check-in device 148) are described in U.S. Pat. No. 8,730,004 to Elfstrom et al., the entire contents of which are hereby incorporated herein by reference. The access control modules described in the '004 patent may have similar characteristics to the readers 128, 132 described herein. Further still, the networking and communication behaviors of the readers 128 may be similar to the parent and child devices described in U.S. Pat. No. 8,102,799 to Alexander et al., the entire contents of which are hereby incorporated herein by reference.

If NFC is being used for the communication channel 136, then the reader 128, 132 and mobile device 116 may have their interfaces/antennas inductively coupled to one another at which point the reader and/or mobile device 116 will authenticate or mutually authenticate with one another. Following authentication, the reader 128, 132 may request a key 124 or multiple keys from the mobile device 116 or the mobile device 116 may offer a key 124 or multiple keys to the reader 128, 132. Upon receiving the key(s) 124 from the mobile device 116, the reader 128, 132 may analyze the key(s) 124 and determine if the key(s) 124 are valid and, if so, allow the holder/user of the mobile device 116 access to the asset protected by the reader 128, 132. It should be appreciated that the mobile device 116 may alternatively or additionally be configured to analyze information received from the reader 128, 132 in connection with making an access control decision and/or in connection with making a decision whether or not to provide key(s) 124 to the reader 128, 132.

If BLE or some other non-inductive protocol (e.g., Wi-Fi) is being used for the communication channel 136, then the reader 128, 132 and mobile device 116 may perform a discovery routine prior to pairing with one another or otherwise connecting to establish the communication channel 136. After the channel 136 is established, however, the reader 128, 132 and mobile device 116 may then authenticate one another and exchange relevant information, such as the key(s) 124, to enable an access control decision to be made. If a positive access control decision is made (e.g., it is determined that the key(s) 124 are valid and the mobile device 116 is allowed to access the asset protected by the reader 128, 132), then the reader 128, 132 may initiate one or more actions to enable the holder/user of the mobile device 116 to access the asset protected by the reader 128, 132.

As will be discussed in further detail herein, the reporting of information from a networked reader 128 to the access control server 140 and/or to a property management system 144 is relatively straight forward. For instance, when a user presents a mobile device 116 to a reader 128, information regarding such an exchanged may be provided from the reader 128 to an access control server 140 or property management system 144 via the access control network 108. On the other hand, a non-networked reader 132 does not have the native capability to report the same type of information directly to the access control servers 140 or property management system 144. Accordingly, it may be desirable for the non-networked reader 132 to leverage the communication channel 136 as a mechanism for communicating the information regarding a first interaction (or first key usage or some other transactional information) back to an access control server 140 or property management system 144. Furthermore, once the mobile device 116 (or more specifically the access control application 120 running on the mobile device 116) is in possession of the interaction data from the non-networked reader 132, the mobile device 116 may decide whether to report the information to the access control servers 140 via the communication network 104 or whether the trusted network 112 can and should be utilized to report the information directly to the property management system 144. As a non-limiting example, the non-networked reader 132 may dictate to the mobile device 116 that the trusted network 112 is to be used to convey the interaction data back to the property management system 114, since the trusted network 112 may be under control of the entity administering the property management system 144 (e.g., the hotel operator). In some embodiments, interaction data may be reported simultaneously by a mobile device 116 to both the access control server(s) 140 and the property management systems via both the communication network 104 and the trusted network 112 (via two reporting messages).

Figure 2:
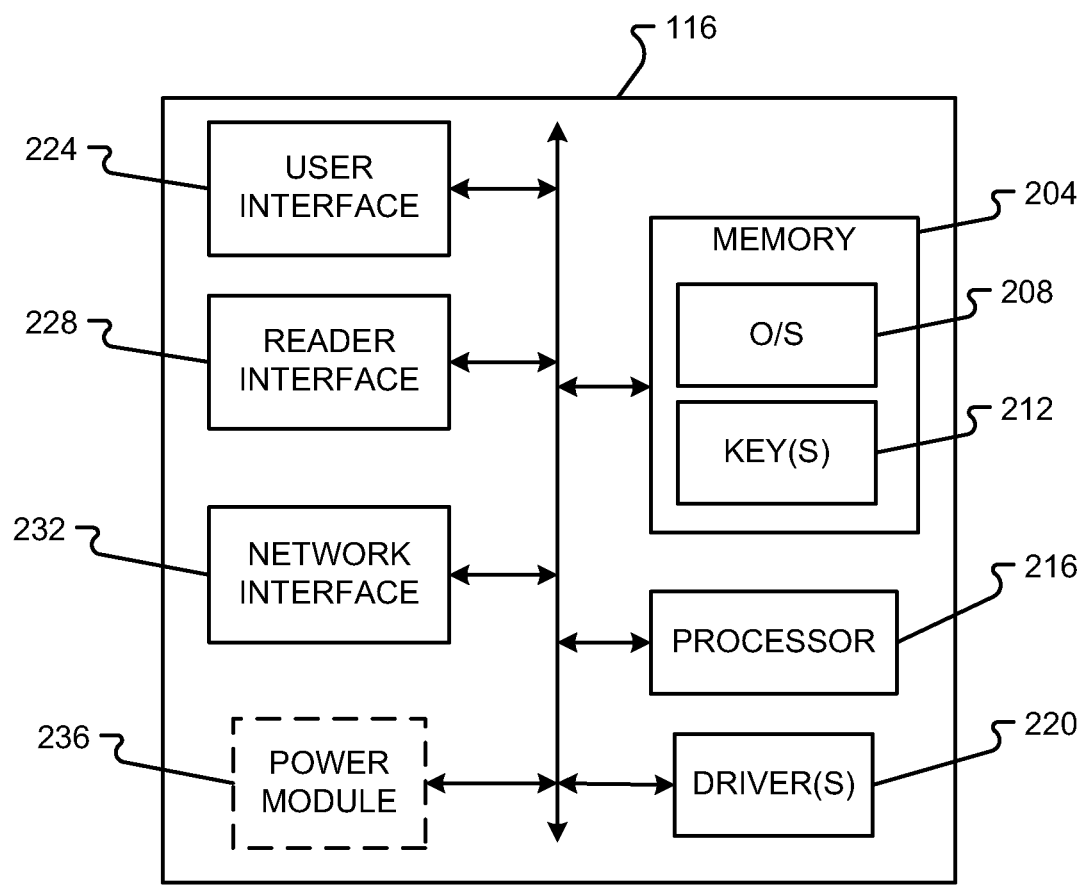
FIG. 2 is a block diagram depicting components of a mobile device in accordance with at least some embodiments of the present disclosure.

With reference now to FIG. 2, additional details of a mobile device 116 will be described in accordance with at least some embodiments of the present disclosure. The mobile device 116 is shown to include computer memory 204 that stores one or more Operating Systems (O/S) 208 and keys 212, among other items. The mobile device 116 is also shown to include a processor 216, one or more drivers 220, a user interface 224, a reader interface 228, a network interface 232, and a power module 236. Suitable examples of a mobile device 116 include, without limitation, smart phones, PDAs, laptops, PCs, tablets, net books, wearable devices, and the like.

The memory 204 may correspond to any type of non-transitory computer-readable medium. In some embodiments, the memory 204 may comprise volatile or non-volatile memory and a controller for the same. Non-limiting examples of memory 204 that may be utilized in the mobile device 116 include RAM, ROM, buffer memory, flash memory, solid-state memory, or variants thereof.

The O/S 208 may correspond to one or multiple operating systems. The nature of the O/S 208 may depend upon the hardware of the mobile device 116 and the form factor of the mobile device 116. The O/S 208 may be viewed as an application stored in memory 204 that is processor-executable. The O/S 208 is a particular type of general-purpose application that enables other applications stored in memory 204 (e.g., a browser, an email application, an SMS application, etc.) to leverage the various hardware components and driver(s) 220 of the mobile device 116. In some embodiments, the O/S 208 may comprise one or more APIs that facilitate an application's interaction with certain hardware components of the mobile device 116. Furthermore, the O/S 208 may provide a mechanism for viewing and accessing the various applications stored in memory 208 and other data stored in memory 208.

The keys 212 may be similar or identical to the keys 124 depicted in FIG. 1. In some embodiments, the key(s) 212 may be stored in the same physical memory 204 as the O/S 208. In other embodiments, the key(s) 212 may be stored in physical computer memory that is separate from the computer memory used to store the O/S 208 and other applications. Even more specifically, the key(s) 212 may be kept in secure or encrypted computer memory, thereby preventing the keys contained therein from being obtained or manipulated by unauthorized parties. Access to the key(s) 212 may be predicated upon certain events and/or user inputs. For instance, a user may be required to input a valid password or PIN at the user interface 224 for the key(s) 212 to be distributed to a reader 128, 132, for example.

The processor 216 may correspond to one or many microprocessors that are contained within the housing of the mobile device 116 with the memory 204. In some embodiments, the processor 216 incorporates the functions of the mobile device's 116 Central Processing Unit (CPU) on a single Integrated Circuit (IC) or a few IC chips. The processor 216 may be a multipurpose, programmable device that accepts digital data as input, processes the digital data according to instructions stored in its internal memory, and provides results as output. The processor 216 may implement sequential digital logic as it has internal memory. As with most known microprocessors, the processor 216 may operate on numbers and symbols represented in the binary numeral system.

The driver(s) 220 may correspond to hardware, software, and/or controllers that provide specific instructions to hardware components of the mobile device 116, thereby facilitating their operation. For instance, the user interface 224, reader interface 228, and network interface 232, may each have a dedicated driver 220 that provides appropriate control signals to effect their operation. The driver(s) 220 may also comprise the software or logic circuits that ensure the various hardware components are controlled appropriately and in accordance with desired protocols. For instance, the driver 220 of the reader interface 228 may be adapted to ensure that the reader interface 228 follows the appropriate proximity-based protocols (e.g., BLE, NFC, Infrared, Ultrasonic, IEEE 802.11N, etc.) such that the reader interface 228 can exchange communications. Likewise, the driver 220 of the network interface 232 may be adapted to ensure that the network interface 232 follows the appropriate network communication protocols (e.g., TCP/IP (at one or more layers in the OSI model), UDP, RTP, GSM, LTE, Wi-Fi, etc.) such that the network interface 232 can exchange communications via the communication network 104, the trusted network 112, or the like. As can be appreciated, the driver(s) 220 may also be configured to control wired hardware components (e.g., a USB driver, an Ethernet driver, etc.).

As mentioned above, the user interface 224 may comprise one or more user input devices and/or one or more user output devices. Examples of suitable user input devices that may be included in the user interface 224 include, without limitation, buttons, keyboards, mouse, pen, camera, microphone, etc. Examples of suitable user output devices that may be included in the user interface 224 include, without limitation, display screens, lights, speakers, etc. It should be appreciated that the user interface 224 may also include a combined user input and user output device, such as a touch-sensitive display or the like.

The reader interface 228 may correspond to the hardware that facilitates communications between the mobile device 116 and a reader 128, 132. The reader interface 228 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 228 is specifically provided to facilitate proximity-based communications over a communication channel 136 or multiple communication channels 136.

The network interface 232 may comprise hardware that facilitates communications with other communication devices over the communication network 104 or trusted network 112. As mentioned above, the network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the mobile device 116 and the communication network 104, 112 and may further be configured to encode and decode communications (e.g., packets) according to a protocol utilized by the communication network 104, 112.

The power module 236 may include a built-in power supply (e.g., battery) and/or a power converter that facilitates the conversion of externally-supplied AC power into DC power that is used to power the various components of the mobile device 116. In some embodiments, the power module 236 may also include some implementation of surge protection circuitry to protect the components of the mobile device 116 from power surges.

Figure 3:
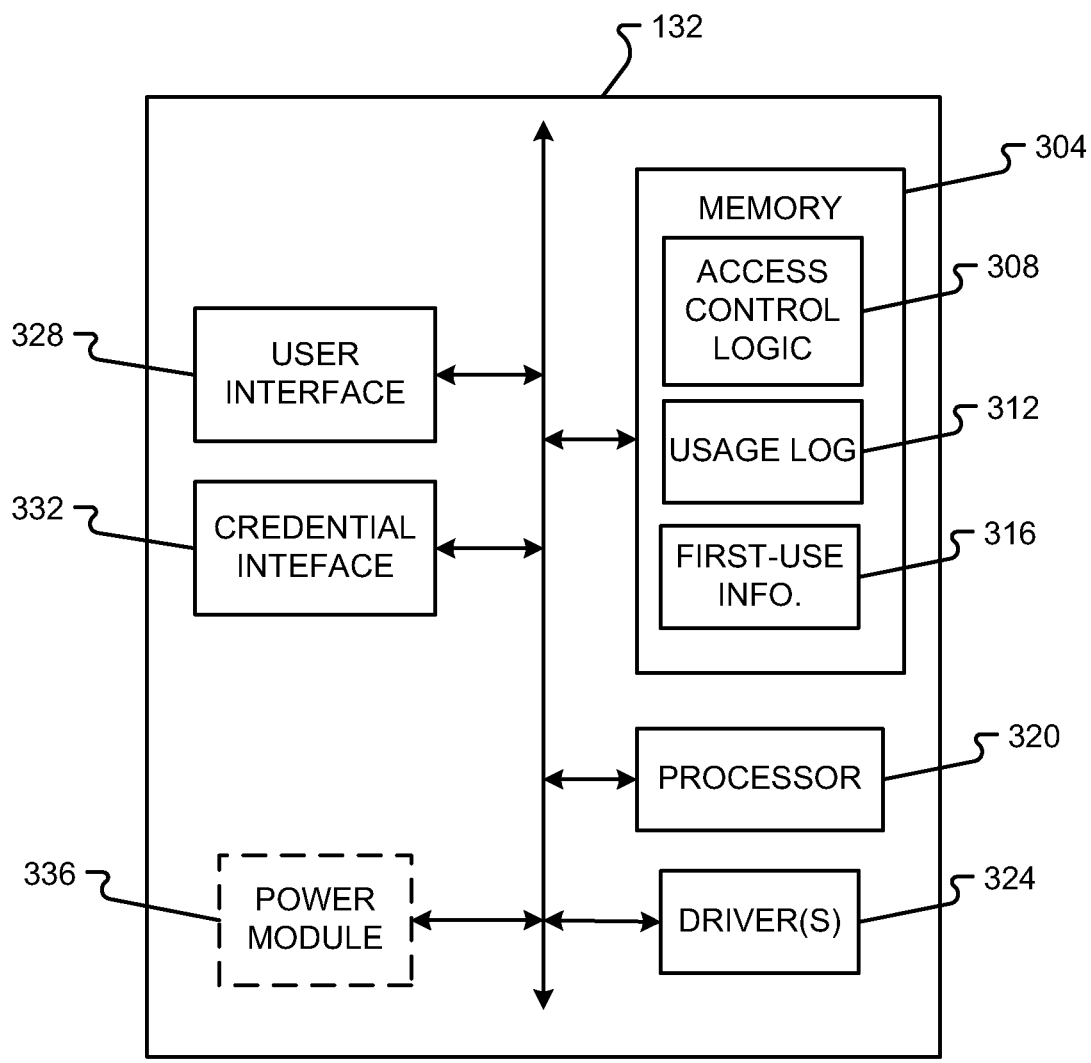
FIG. 3 is a block diagram depicting components of a lock/reader in accordance with at least some embodiments of the present disclosure.

With reference now to FIG. 3, additional details of a non-networked reader 132 will be described in accordance with at least some embodiments of the present disclosure.

The non-networked reader 132 is depicted in FIG. 3, but it should be appreciated that similar components may be included in a networked reader 128. The difference between the networked reader 128 and non-networked reader 132 may correspond to the fact that the networked reader 128 has a network interface that connects the reader 128 to the access control network 108, either via a wired or wireless communication channel. The non-networked reader 132, however, is devoid of a network interface or such an interface is deactivated or unused by the non-networked reader 132. In some embodiments, a reader having intermittent, but non-continuous, communication capability with a network may be considered a non-networked reader 132. Thus, any reader without the ability to communicate via a communication network on-demand may be considered a non-networked reader 132.

The reader 132 is shown to include computer memory 304 that stores access control logic 308, a usage log 312, and first-use information 316, among other items. The reader 132 is also shown to include a processor 320, one or more drivers 324, a user interface 324, a credential interface 332, and a power module 336.

In some embodiments, the access control logic 308 is implemented as firmware, although it may also be possible to implement the access control logic 308 as software or in an Application Specific Integrated Circuit (ASIC). In some embodiments, the usage log 312 may contain information regarding interactions between the reader 132 and credentials, such a mobile devices 116 and traditional access control cards or key fobs, which may be referred to as credential-type devices. The type of information that may be stored in the usage log 312 includes dates and times of interactions with credential-type devices, whether any such interactions corresponded to a first or subsequent interaction with that particular device, which key(s) were used during the interaction, the results of the access control decision made by the access control logic 308, etc. In addition to the usage log 312, the memory 304 may also contain first-use information that is specific to instances of a key's first use and/or instances of a first interaction between a particular credential-type device and the reader 132.

In some embodiments, a key 124, 212 may be updated after it has been used for a first time, thereby enabling all subsequent readers to know that it is not receiving a key 124, 212 as a first instance of that key's use in the access control system. As an example, a key 124, 212 may be updated with a flag or marker after it has first been delivered to a reader 128, 132. All subsequent transmissions or uses of that key 124, 212 will include the updated flag or marker indicating that the key is no longer being used for the first time. Therefore, when a reader 128, 132 receives a key 124, 212 and that key is not marked as being used previously, then the reader 128, 132 will know that it is receiving the key 124, 212 during its first use. This information may be stored in the first-use information 316 along with a time of the transaction, an identity of the mobile device 116, an identity of the reader 128, 132, and whether access was granted or denied. The first-use information 316 and/or information from the usage log 312 may subsequently be transmitted by the reader 132 back to the mobile device 116 via the communication channel 136 for subsequent delivery to the access control server(s) 140 and/or property management system 144.

The processor 320 of the reader 132 may be similar in nature to the processor of a mobile device 116. In some embodiments, the processing capabilities of the processor 320 may be limited as compared to the processing capabilities of the processor 216. As an example, the processor 320 may comprise an IC chip or multiple IC chips configured to execute the firmware or instructions stored in memory 304.

Likewise, the driver(s) 324 may comprise software, firmware, or embedded hardware that facilitates operations of components of the reader 132. For instance, the user interface 328 may have a dedicated driver 324. The credential interface 332 may also have a dedicated driver 324. Other components of the reader 132 may also have their own drivers 324.

The user interface 328 may correspond to a user input and/or user output device. In a reader 132 the user interface 328 is traditionally a relatively simple device, though simplicity is not a requirement. For instance, the user interface 328 may comprise a simple visual display (e.g., light, LED, 8-segment display, etc.) or a more elaborate visual display (e.g., LCD screen). A user input portion of the user interface 328 may comprise a PIN pad, fingerprint sensor, retina scanner, or the like. The user interface 328 may also facilitate audible interactions with the reader 132. For instance, the user interface 328 may comprise a buzzer, speaker, microphone, photodetector, proximity detector, etc. Alternatively or additionally, the user interface 328 may comprise a combined user input and user output device, such as a touch-sensitive display with configurable buttons.

The credential interface 332 may comprise the hardware, circuits, or the like that facilitate the establishment of the communication channel 136. As some non-limiting examples, the credential interface 332 may comprise an antenna, tuning circuitry, a BLE antenna, a Wi-Fi antenna, a magstripe reader, a photodetector, an infrared emitter, a microphone, a speaker, and the like.

The power module 336 may correspond to a dedicated power source and/or a power converter that facilitates the conversion of externally-supplied AC power into DC power that is used to power the various components of the reader 132. In some embodiments, the power module 336 may also include some implementation of surge protection circuitry to protect the components of the reader 132 from power surges.

Figure 4:
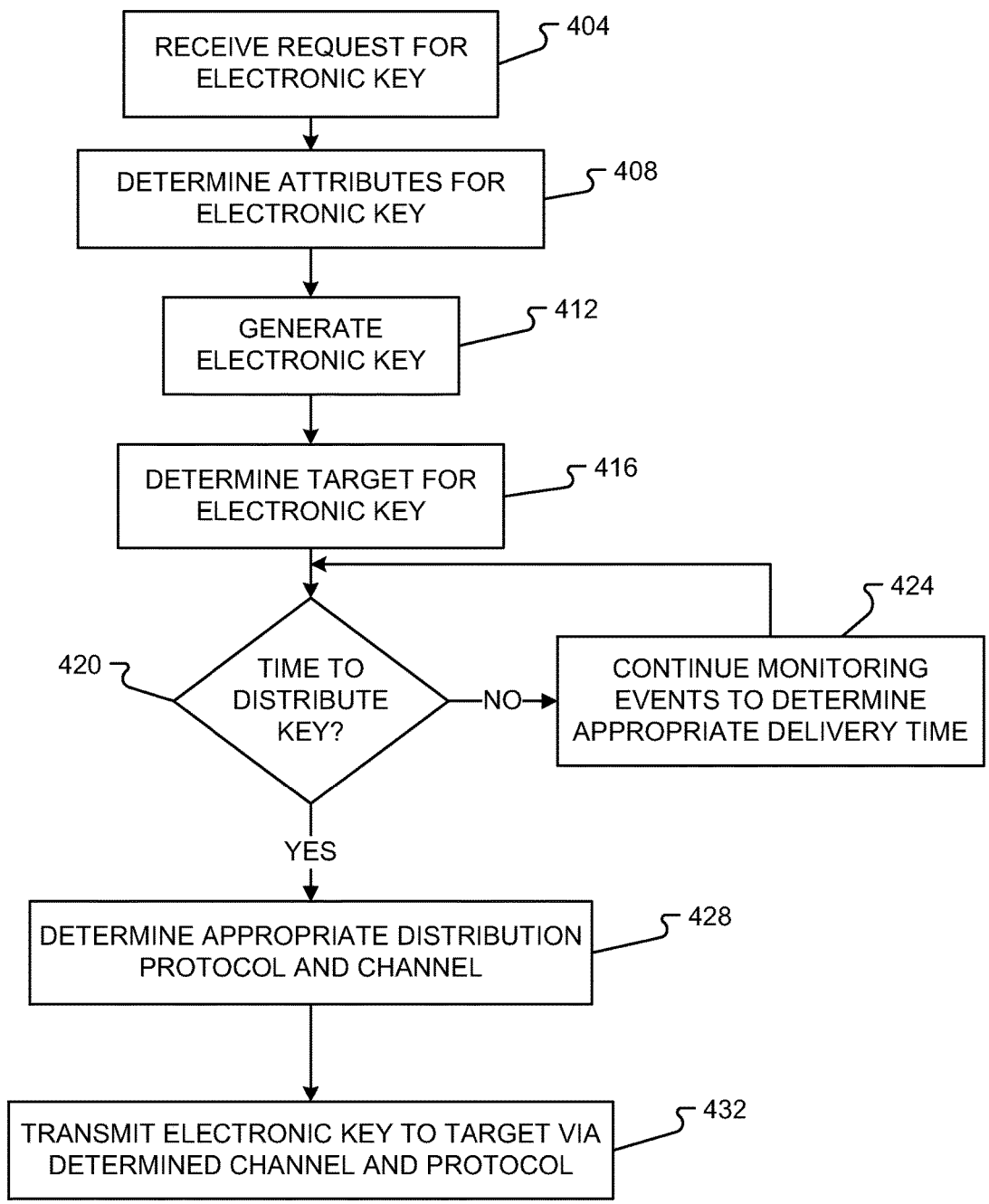
FIG. 4 is a flow diagram depicting a method of generating and delivering keys to a mobile device in accordance with embodiments of the present disclosure.

With reference now to FIG. 4, a method of delivering a key 124, 212 to a mobile device 116 will be described in accordance with at least some embodiments of the present disclosure. The method begins when a request for an electronic key or set of electronic keys is received at the property management system 144 (step 404). The request may be received in response to a guest confirming a desire to stay at a hotel, in response to a guest confirming a desire to enter a house, in response to an office guest confirming their meeting at an office, or the like. The request for a key may then be forwarded from the property management system 144 to an access control server 140. Upon receiving the request for the electronic key from the property management system 144, the access control server(s) 140 will determine whether the request is a valid and actionable request (e.g., whether the request came from a trusted source, in a trusted format, and should result in the creation of an electronic key). The authentication between the access control server(s) 140 and property management system 144 may be completed using any type of authentication protocol.

If the authentication is successful, then the access control server(s) 140 will determine attributes for the electronic key (step 408). These attributes may include a property or site code to be assigned to the electronic key, an encryption for the electronic key, a duration of validity for the electronic (which may be indefinite or finite), and other attributes that will belong to the key. Based on the attributes, the access control server(s) 140 will generate the electronic key(s) (step 412) and then determine one or more targets for the keys (step 416). The targets for the key(s) may include one or more mobile devices 116 that were identified in the request for the key in step 404. Alternatively or additionally, the target for the key(s) may include credentials other than a mobile device 116, such as a traditional smart card, key fob, or the like.

After the target for the electronic key has been determined, the access control server(s) 140 determine whether or not it is time to distribute the key (step 420). The timing of distribution may be based on an amount of time prior to a guest's anticipated arrival or check-in. Alternatively or additionally, the timing of distribution may be event-based or triggered by a sequence of events. Of course, the distribution may be both time-based and event-based. As an example of a time-based distribution, the electronic key may not be distributed to the target device until a predetermined amount of time prior to a guest's anticipated check-in to a hotel. As another example of a time-based distribution, the electronic key may not be distributed to the target device until a predetermined amount of time prior to a scheduled meeting. As an example of an event-based distribution, the electronic key may not be distributed until the guest is within a predetermined distance or proximity of a hotel, house, or office building. Another example of an event-based distribution would be to wait until a mobile device 116 is connected to a predetermined communication network 104 or trusted network 112. An example of a combined time-based and event-based distribution would be to limit distribution of a key until a predetermined amount of time prior to a guest's anticipated check-in and until the guest's mobile device 116 has connected to a trusted network 112 of the property where the guest is checking-in.

If the query of step 420 is answered negatively, then the access control server(s) 140 will continue monitoring events, time, and other triggers to determine an appropriate delivery time (step 424). If the query of step 420 is answered affirmatively, an appropriate distribution protocol and channel are determined for the distribution then the electronic key(s) (step 428). For example, it may be determined that a cellular network and cellular communication protocol can be used to deliver the keys to the mobile device 116 over the communication network 104. As another example, it may be determined that a more secure delivery channel is required, in which case the trusted network 112 may be required for delivery of the key.

After the appropriate channel and protocol have been determined, the electronic key(s) are transmitted to their target via the determined channel and protocol (step 432). The delivery of the key(s) may employ traditional protocols such as HTTP/HTTPS, SNMP, FTP, SMS messages, MMS messages, RTP, UDP, etc. or non-traditional/proprietary protocols. In some embodiments, the path used to deliver the key to the target may be referred to as a key delivery path and may follow a specific set of nodes when traveling across the communication network 104 or trusted network 112.

Figure 5:
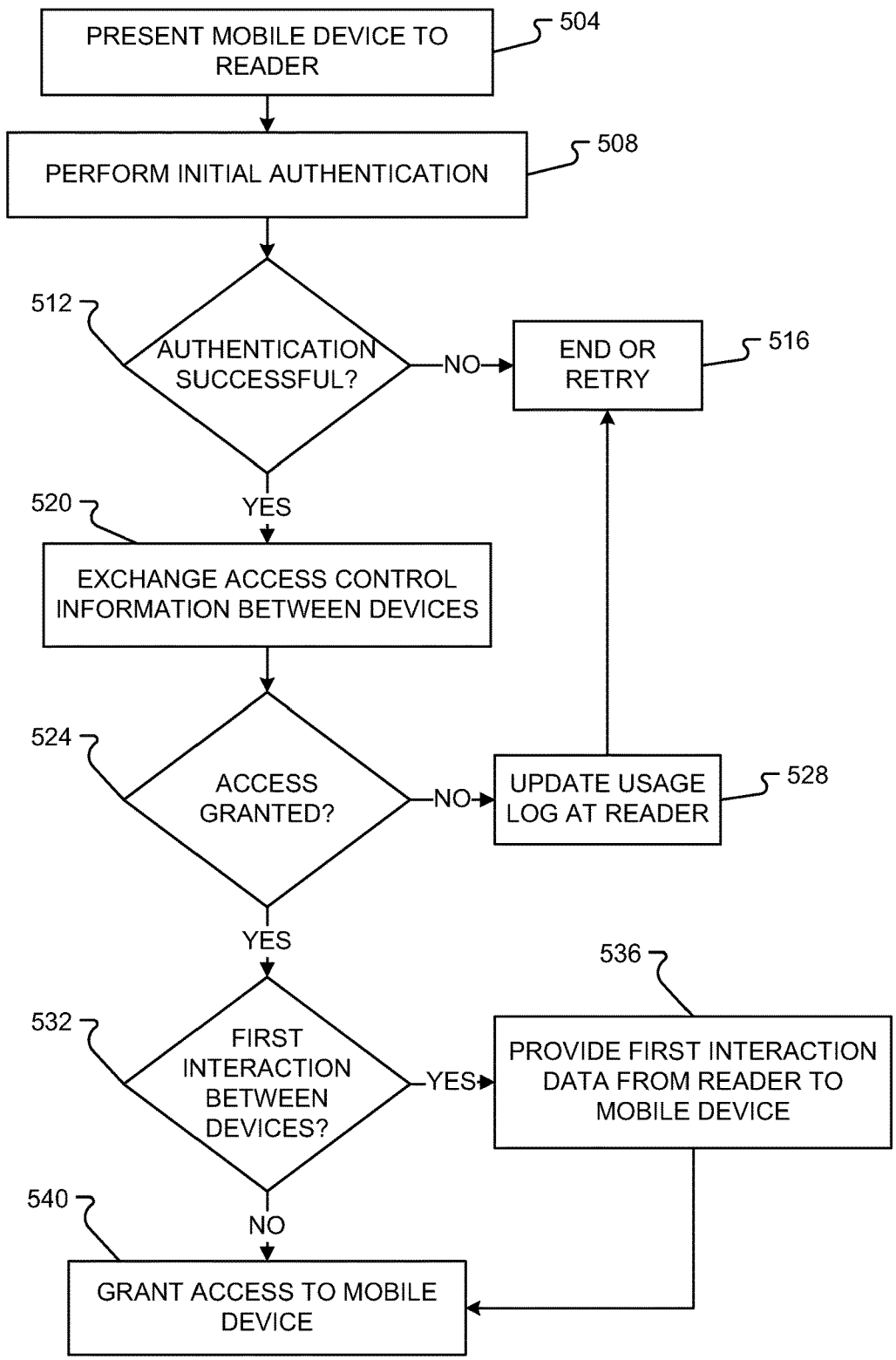
FIG. 5 is a flow diagram depicting a method of reporting first interaction data in accordance with embodiments of the present disclosure.

With reference now to FIG. 5, a method of reporting first interaction data will be described in accordance with embodiments of the present disclosure. The method begins when a mobile device 116 is presented to a reader 128, 132 (step 504). This may involve bringing the mobile device 116 within a communication range of the reader 128, 132, pairing the mobile device 116 with the reader 128, 132, or the like. Once the devices are within a communication range of one another, an initial authentication may be performed (step 508). The authentication may be mutual or one way, depending upon preferences and administrative settings at the reader 128, 132 and/or mobile device 116. If the authentication is unsuccessful (step 512), then the method will either end or allow a retry of the authentication (step 516).

If the authentication is successful (step 512), then the two devices can continue by exchanging access control information (step 520). In this step, the mobile device 116 may convey one or more electronic keys to the reader 128, 132 via the communication channel 136 established between the two devices. The reader 128, 132 may also provide identification information and/or keys to the mobile device 116 during this step. Any other type of information used in connection with making an access control decision can be exchanged between the two devices (in either direction) via the communication channel 136.

Based on the information exchanged in step 520, the reader 128, 132 and/or mobile device 116 can make a determination as to whether or not the holder of the mobile device 116 is allowed to access an asset protected by the reader 128, 132 (step 524). If this query is answered negatively, then the reader 128, 132 may update its usage log 312 (step 528). The reader 128, 132 may then end the exchange or allow a retry (step 516).

If the query of step 524 is answered positively, then the reader 128, 132 will determine if this is the first interaction that the mobile device 116 has had with the access control system (e.g., determine whether this corresponds to a first-entry event) (step 532). This determination may correspond to determining whether the interaction between the specific mobile device 116 and reader 128, 132 is a first interaction in general. This determination may also involve determining if the key used by the mobile device corresponds to a first use instance of that key, either globally (e.g., among all readers in the access control system) or locally (e.g., specific to the current reader 128, 132). As discussed above, the reader 128, 132 may analyze properties of the key to determine if the key has been previously used or not, for example by analyzing the key for some indication of first use (or an indication of subsequent use via the marking of a use flag in the key). Analysis of the key as opposed to the mobile device 116 may be useful, especially for situations of frequent visitors to a property. For example, a guest may stay with a specific hotel a number of times over the course of a year, but the guest's mobile device 116 will use a different key for each such stay. If the mobile device 116 itself were analyzed for a first interaction, then all subsequent stays during the year would not be registered as a check-in event. On the other hand, if the keys used for a specific stay are analyzed, then a proper check-in can be determined for each stay instance.

It should also be appreciated that the analysis of step 532 may be performed in step 528 when the mobile device 116 is denied access. The illustration of step 532 as coming from only a positive access control decision is for ease of understanding and simplicity and should not be construed as limiting embodiments of the present disclosure.

If the interaction corresponds to a first interaction (or a first use of the key by the mobile device 116), then the reader 128, 132 may generate a bundle of first interaction data and attempt to report the first interaction data back to the access control server(s) 140 and/or property management system 144. If the reader is a networked reader 128, then the first interaction data can be simply transmitted via the access control network 108 to the access control servers 140 and/or property management system 144. On the other hand, if the reader corresponds to a non-networked reader 132, then the reader 132 will provide the first interaction data back to the mobile device 116 (step 536). In some embodiments, the first interaction data is provided back to the mobile device 116 over the same communication channel 136 used to exchange access control information. If the determination at step 532 is made quickly enough, the non-networked reader 132 may even be able to provide the first interaction data back to the mobile device 136 during the same instance of presentation used to communicate the access control information. In other words, a user may not need to present the mobile device 116 to the reader 132 twice to facilitate the communications of step 520 and 536. Instead, the first interaction data may be efficiently transmitted back to the mobile device 116 while the mobile device 116 is being held in front of the reader 132 and waiting for an access control decision.

Non-limiting examples of the types of information that can be provided in the first interaction data include an identity or identification number of the reader 132, an identifier of the key or guest, a time of the transaction, a day of the transaction, whether the access control decision was positive or negative, current temperature, reader 132 status information (e.g., low battery), etc.

Thereafter, the reader 128, 132 grants the mobile device 116 and the holder thereof access to the asset protected by the reader 128, 132 (step 540).

Figure 6:
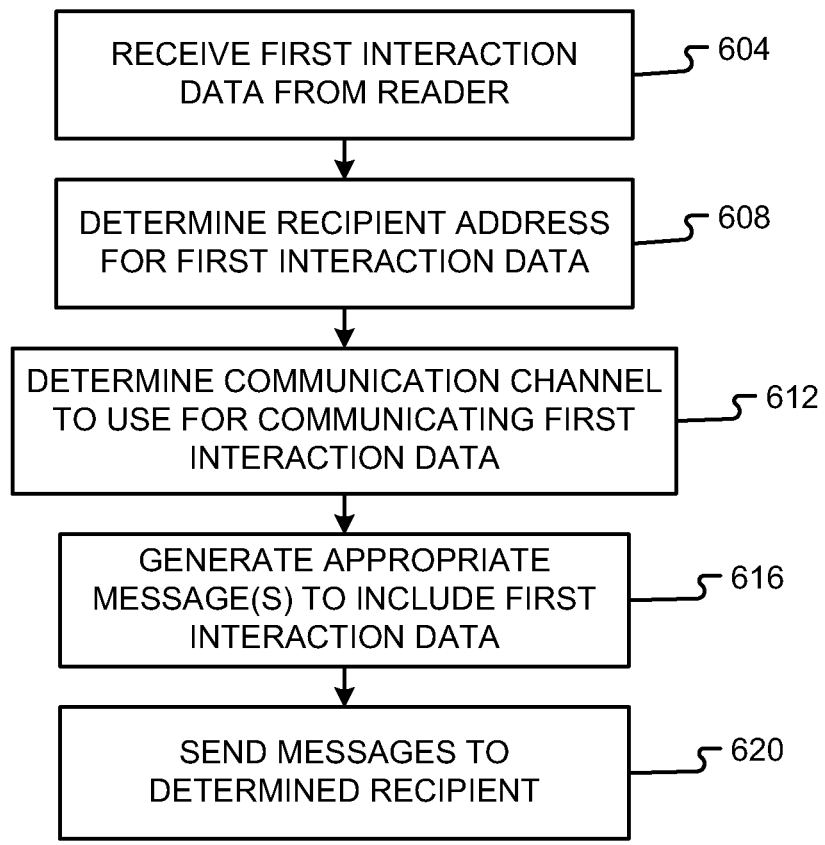
FIG. 6 is a flow diagram depicting a method of distributing first interaction data in accordance with embodiments of the present disclosure.

With reference now to FIG. 6, a method of distributing first interaction data will be described in accordance with embodiments of the present disclosure. The method begins when a mobile device 116 receives first interaction data from a reader 132 (step 604). The first interaction data may be received via the communication channel 136 used during authentication and/or during the exchange of access control information.

When the mobile device 116 receives the first interaction data, the mobile device 116 then determines a recipient address for the first interaction data (step 608). This information may be contained within the first interaction data, it may be provided as separate instructions to the mobile device 116 from the reader 132, or the mobile device 116 may comprise the intelligence to make such a determination (as it may be included as part of the access control logic 308). The mobile device 116 may also make a determination as to which communication channel or pathway should be used to deliver the first interaction data to the recipient address (step 612). In some embodiments, the mobile device 116 may determine that the first interaction data is to travel a reverse path of the key delivery path. In other words, the mobile device 116 may simply send the first interaction data back to the same entity from which it received its electronic keys and the mobile device 116 may utilize the same communication channel/network for sending the first interaction data. In other embodiments, an administrator of the access control system may dictate that the first interaction data is to be delivered directly to the property management system 144 and this information may be delivered via a trusted network 112 delivery path instead of traveling a reversal of the key delivery path.

Once the recipient address and appropriate communication channel are determined, the mobile device 116 generates an appropriate message or set of messages to include the first interaction data (step 616). The mobile device 116 then sends the message(s) to the determined recipient address (step 620).

Figure 7:
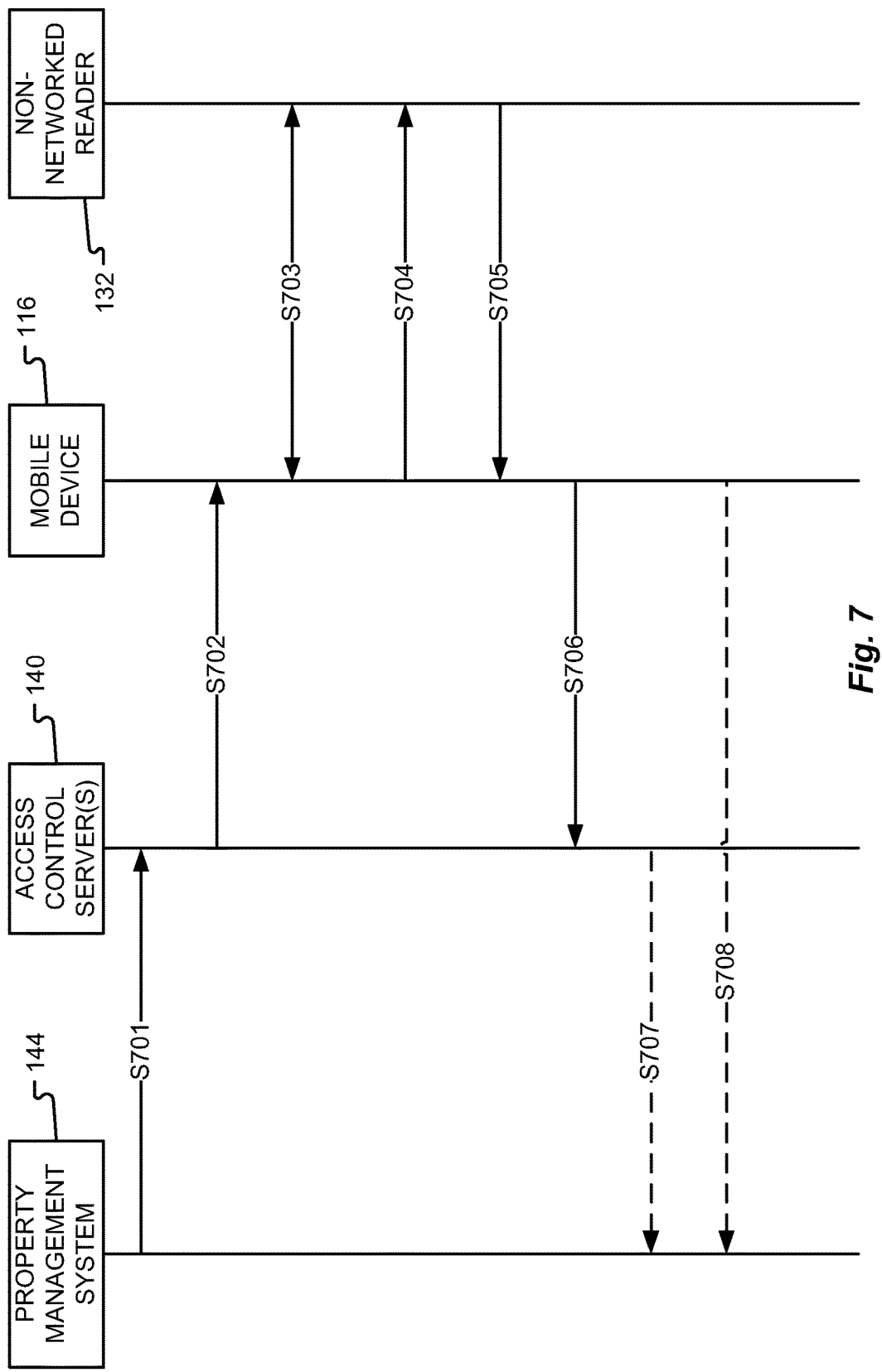
FIG. 7 is a flow diagram depicting steps for using a key delivery path and a reverse of the key delivery path in accordance with embodiments of the present disclosure.

With reference now to FIG. 7, additional details of the communication paths that can be used to deliver electronic keys and first interaction data will be described in accordance with at least some embodiments of the present disclosure. The process depicted in FIG. 7 begins when the property management system 144 transmits an electronic key request to the access control server(s) 140 (step S701). The access control server(s) 140, in response to receiving the request, transmit one or more electronic keys to a target mobile device 116 (step S702). In some embodiments, the delivery of the electronic keys in step S702 utilizes the communication network and may involve the use of multiple network types (e.g., Internet and cellular communication network). Accordingly, the path traveled by the message(s) carrying the electronic keys may traverse multiple network boundaries and multiple network border elements.

The mobile device 116 then receives the electronic keys and stores the keys in its access control application 120 or memory 204. The mobile device 116 retains the keys until it is presented to a non-networked reader 132 (or networked reader 128), at which point communications can begin and an authentication may occur between the two devices (step S703). If a trusted relationship can be established, then the communication channel 136 may be used to deliver the electronic key to the non-networked reader 132 (step S704). The non-networked reader 132 may then make an access control decision based, at least in part, on the contents of the electronic key. The non-networked reader 132 may also determine that its receipt of the electronic key from the mobile device 116 corresponds to a first use of the electronic key, in which case the non-networked reader 132 may generate and deliver first interaction data back to the mobile device 116, again via the communication channel 136 (step S705). In some embodiments, the steps S703, S704, and S705 may be performed during a single presentation of the mobile device 116 to the reader 132. Of course, the steps may not be performed precisely simultaneously, but to a user holding the mobile device 116, the steps may be performed during an amount of time that is perceived by the user to be simultaneous. In other embodiments, the step S705 may occur after the mobile device 116 is first presented to the reader 132 and the reader 132 may prompt the holder of the mobile device 116 to re-present the mobile device 116 back to the reader 132 so that a check-in process can be completed and the reader 132 can deliver first interaction data back to the mobile device 116.

The mobile device 116 then provides an indication to the access control server(s) 140 of the results of the access control decision implemented at the reader 132 (step S706). Furthermore, the mobile device 116 may deliver the first interaction data back to the access control server(s) 140 during step S706. The access control server(s) 140 can then provide the first interaction data to the property management system 144 (step S707). Alternatively or additionally, the mobile device 116 may deliver the first interaction data directly to the property management system 144 (step S708). As can be appreciated, the key delivery path and the first interaction data delivery path may substantially match one another, but in a reversed order. In other embodiments, the utilization of the communication channel 136 may correspond to the only commonality between the key delivery path and the first interaction data delivery path.

Figure 8:
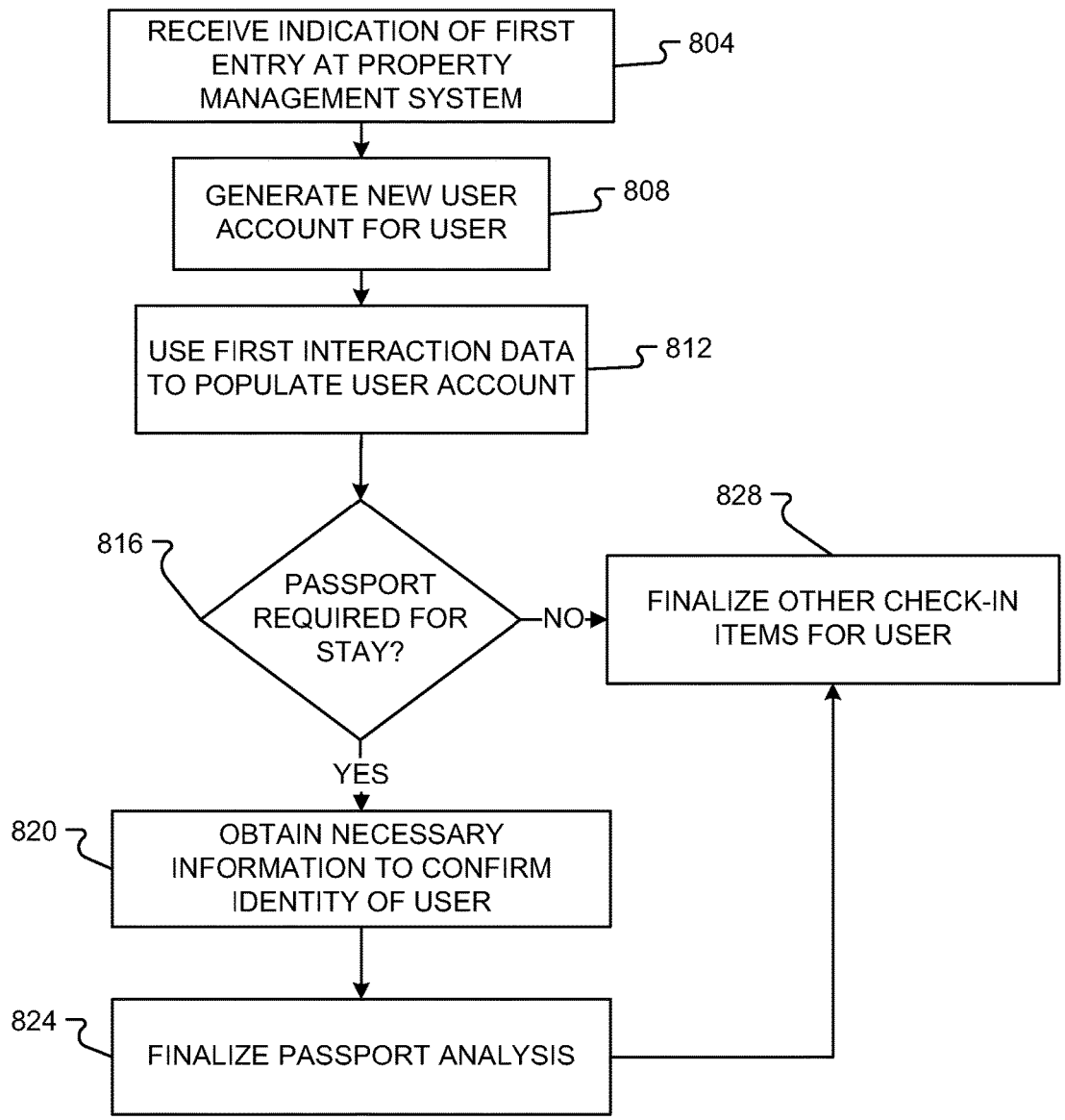
FIG. 8 is a flow diagram depicting a method of performing check-in processes in response to receiving an indication of first entry at a property management system in accordance with embodiments of the present disclosure.

With reference now to FIG. 8, a method of performing check-in processes in response to receiving an indication of first entry at a property management system 144 will be described in accordance with embodiments of the present disclosure. The method begins when an indication of a guest's first entry is received at the property management system 144 (step 804). The indication may be received in response to the property management system receiving first interaction data from either the access control server(s) 140 or from a mobile device 116. The first interaction data may indicate that a particular guest (or key associated with a guest) has arrived at a particular reader 128, 132 and that the reader 128, 132 has completed a first instance of an interaction with the guest's mobile device 116 for this particular stay.

Upon receiving the indication of first entry, the property management system initiates a guest check-in process where a new user account is created for that user, where the account is specific to this particular guest's stay and the room assigned to the guest (step 808). If the guest has a frequent guest account, then the newly-generated account may be associated with the frequent guest account in a customer relationship management database. In some embodiments, at least some information from the first interaction data is used to populate the newly-generated account (step 812). For example, if the first interaction data includes an identifier of the reader 128, 132 with which the mobile device 116 first interacted and that reader 128, 132 corresponds to a room that is assigned or may be assigned to the guest (e.g., a vacant room), then the reader identifier contained in the first interaction data may be included in the newly-generated account to identify the room that has been assigned to the guest. As another example, if the guest first presented the mobile device 116 to a reader associated with a Point of Service (PoS) machine, then an identifier of the reader as well as transaction data for the guest may be incorporated into the newly-generated account.

The method continues with the property management system 144 determining if a passport is required for the guest's stay (step 816). If this query is answered negatively, then the method continues by finalizing other check-in items for that user's account (e.g., ensuring that a credit card is on file for the guest, lining up an itinerary for the guest, etc.).

However, if the query of step 816 is answered positively, then the guest may be asked to provide additional information to confirm their identity and that they are holding a valid passport (step 820). In some embodiments, the guest may be able to enter their passport information via the reader and/or mobile device 116. In some embodiments, the guest may provide a picture of their passport and transmit that picture to the property management system 144. In some embodiments, a customer service representative from the hotel may be dispatched to meet with the guest at their known location (e.g., toward the reader where the first interaction occurred) to verify the passport information.

After the passport analysis is finalized (step 824), the method can continue to step 828 where other check-in items for the guest are finalized.

Figure 9:
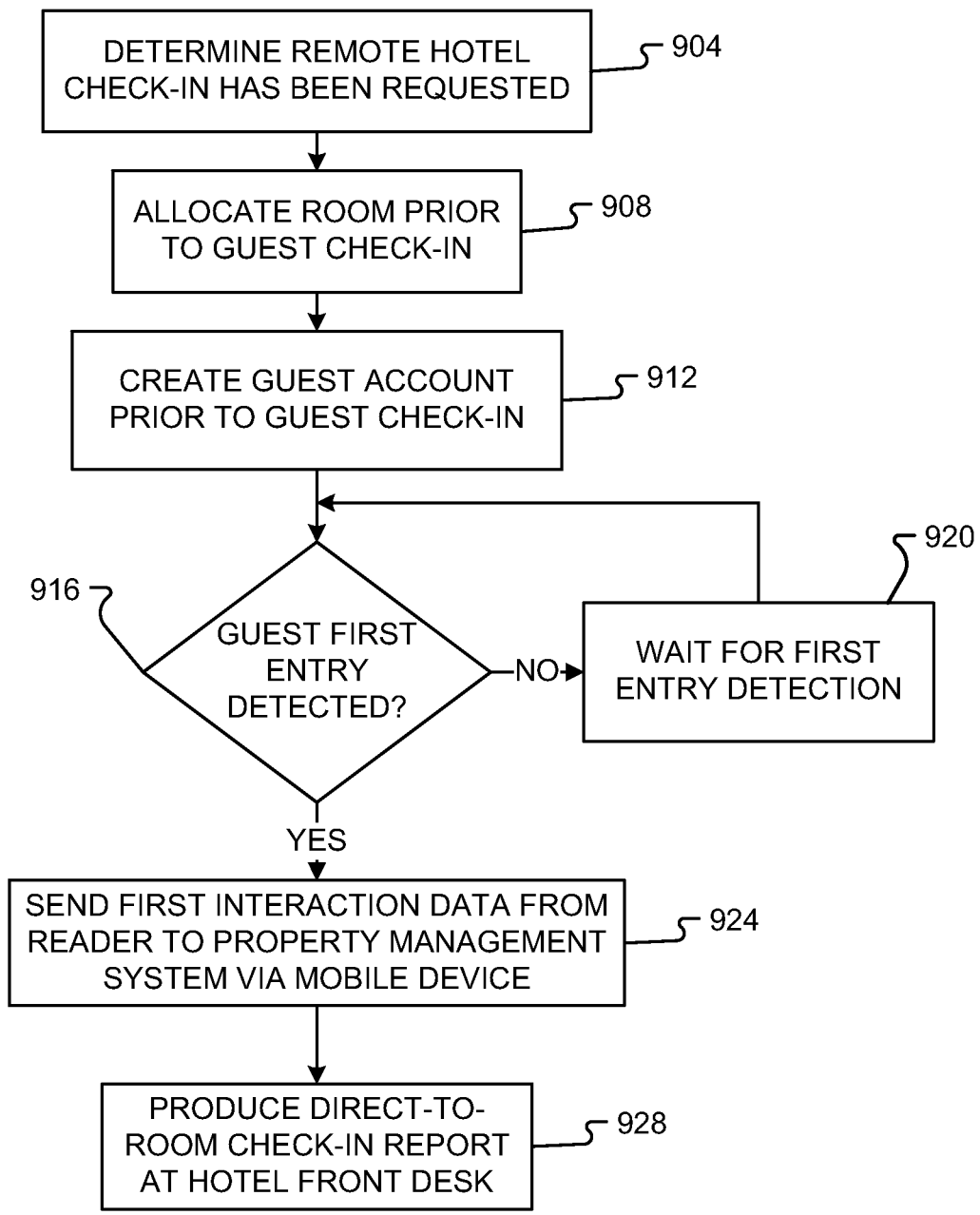
FIG. 9 is a flow diagram depicting a method of producing a direct-to-room check-in report in accordance with embodiments of the present disclosure.

With reference now to FIG. 9, a method of producing a direct-to-room check-in report will be described in accordance with embodiments of the present disclosure. The method begins by determining that a remote hotel check-in has been requested (step 904). This request may be specifically provided during a guest's purchase of their room. Alternatively, the option may be provided to the user after the purchase has been completed and the user may accept or deny the option.

When the property management system 144 determines that the guest desires remote check-in, thereby allowing them to bypass the front desk, the property management system 144 allocates a room for the guest prior to check-in or anticipated arrival (step 908). The allocated room may correspond to a specific room or a set of rooms that are available to the guest for selection by the guest. The identification of the room allocated to the guest may be communicated to the guest via a message transmitted to the guest's mobile device 116.

The property management system 144 then creates a guest account prior to the guest arrival (step 912). The method then waits until the guest's first entry or arrival is detected (steps 916 and 920). Once the guest's arrival is detected, the first interaction data associated with this first arrival is sent from the reader 128, 132 to the property management system 144 (step 924). The property management system 144 then produces a direct-to-room check-in report at the hotel front desk as if a normal check-in has just occurred (step 928).

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged without departing from the scope of the present disclosure. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of administering an access control system for a multi-room property having a plurality of locks, at least one of which is an offline lock and has no direct wired connectivity to an access control system backend, the method comprising:
   determining that a guest has requested check-in to the multi-room property;
   assigning a room from the multi-room property to the guest;
   determining a lock that is used to secure the room;
   generating an electronic key that contains information enabling access to the determined lock;
   transmitting the electronic key to a mobile device of the guest, wherein the electronic key is transmitted to the mobile device via a wireless communications network;
   creating a guest account within a property management system (PMS) of the multi-room property prior to the guest arrival at the multi-room property;
   determining that the mobile device has been presented to the lock for a first time;
   analyzing the electronic key transmitted to the mobile device and the information contained therein at the electronic lock;
   determining to grant the guest access to the room based on the analysis of the electronic key and the information contained therein; and
   transmitting information from the lock to the mobile device in response to determining to grant the guest access to the room, wherein the information is only transmitted to the mobile device the first time that the mobile device is presented to the lock and the guest is granted access to the room, and wherein the information transmitted from the lock to the mobile device includes a room identifier, success information, and/or a first use indication.

2. The method of claim 1, wherein the electronic key is provided to the lock via an NFC coupling and wherein the information transmitted from the lock to the mobile device is also provided during the same NFC coupling, thereby obviating the need for multiple connections between the mobile device and the lock.

3. The method of claim 1, wherein the electronic key is provided to the lock via a Bluetooth connection and wherein the information transmitted from the lock to the mobile device is also provided during the same Bluetooth connection, thereby obviating the need for multiple connections between the mobile device and the lock.

4. The method of claim 1, wherein the information transmitted from the lock to the mobile device is subsequently transmitted to the PMS and is stored in the guest account.

5. The method of claim 1, wherein the information regarding first use of the mobile device with the lock is deleted from memory of the lock following transmission from the lock to the mobile device.

6. The method of claim 4, wherein the property management system generates a report at a front desk identifying check-in by the guest.

7. The method of claim 6, further comprising:
   analyzing the electronic key with access control logic stored in memory of the reader; and
   making an access control decision for the mobile device based on the analysis of the electronic key.

8. The method of claim 6, wherein determining that the receiving the electronic key corresponds to a first instance of the electronic key having been used by the mobile device comprises analyzing a usage log in the non-networked reader to determine that the electronic key has not been presented to the non-networked reader.

9. The method of claim 6, wherein the first interaction data is transmitted to the mobile device immediately after determining that the receiving the electronic key corresponds to a first instance of the electronic key having been used by the mobile device.

10. The method of claim 9, wherein the first interaction data is transmitted via the communication channel during a same presentation of the mobile device to the non-networked reader that resulted in delivery of the electronic key.

11. The method of claim 6, wherein the communication channel corresponds to a Radio Frequency (RF) channel.

12. The method of claim 11, wherein Near Field Communications (NFC) and/or Bluetooth is used by the mobile device and non-networked reader to exchange information via the communication channel.

13. A method of communicating information about a guest's remote check-in, wherein the guest's remote check-in occurs via a non-networked reader, the method comprising:
   using a credential interface of the non-networked reader to establish a communication channel with a mobile device;
   receiving an electronic key from the mobile device over the communication channel;
   determining that the receiving the electronic key corresponds to a first instance of the electronic key having been used by the mobile device by analyzing contents of the electronic key for an indication of whether the electronic key has been presented to any other reader prior to being presented to the non-networked reader;
   in response to determining that the receiving the electronic key corresponds to a first instance of the electronic key having been used by the mobile device, generating first interaction data; and
   transmitting the first interaction data to the mobile device via the communication channel.

14. The method of claim 13, wherein the first interaction data comprises an identifier of the non-networked reader.

15. The method of claim 14, wherein the first interaction data further comprises results of an access control decision made at the non-networked reader in response to analyzing the electronic key.

16. The method of claim 15, wherein results of the access control decision are included in the first interaction data.

17. The method of claim 13, wherein the first interaction data further comprises a time associated with receiving the electronic key at the reader.

18. The method of claim 13, wherein analyzing contents of the electronic key for an indication of whether the electronic key has been presented to any other reader prior to being presented to the non-networked reader comprises analyzing the electronic key for a marker indicative of delivery of the electronic key to a reader.

* * * * *